(12) United States Patent
Heo et al.

(10) Patent No.: US 10,123,007 B2
(45) Date of Patent: Nov. 6, 2018

(54) METHOD AND APPARATUS FOR PROCESSING VIDEO SIGNAL

(71) Applicant: LG ELECTRONICS INC., Seoul (KR)

(72) Inventors: Jin Heo, Seoul (KR); Jiwook Jung, Seoul (KR); Sehoon Yea, Seoul (KR); Moonmo Koo, Seoul (KR); Taesup Kim, Seoul (KR); Jaewon Sung, Seoul (KR); Eunyong Son, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 452 days.

(21) Appl. No.: 14/759,383

(22) PCT Filed: Jan. 8, 2014

(86) PCT No.: PCT/KR2014/000204
§ 371 (c)(1),
(2) Date: Jul. 6, 2015

(87) PCT Pub. No.: WO2014/109547
PCT Pub. Date: Jul. 17, 2014

(65) Prior Publication Data
US 2015/0358616 A1 Dec. 10, 2015

Related U.S. Application Data

(60) Provisional application No. 61/750,314, filed on Jan. 8, 2013, provisional application No. 61/750,739, filed on Jan. 9, 2013.

(51) Int. Cl.
*H04N 19/105* (2014.01)
*H04N 19/44* (2014.01)
(Continued)

(52) U.S. Cl.
CPC ......... *H04N 19/105* (2014.11); *H04N 19/176* (2014.11); *H04N 19/44* (2014.11); *H04N 19/52* (2014.11); *H04N 19/597* (2014.11)

(58) Field of Classification Search
CPC ................................................. H04N 19/105
(Continued)

(56) References Cited

U.S. PATENT DOCUMENTS

2011/0044550 A1\* 2/2011 Tian ...................... H04N 19/597
382/238
2011/0211638 A1\* 9/2011 Sohn .................... H04N 19/597
375/240.16

FOREIGN PATENT DOCUMENTS

CN 102710949 A 10/2012
CN 102761765 A 10/2012
(Continued)

OTHER PUBLICATIONS

Chen, Yi-Wen et al., "3D-CE2.a related: MB-level depth-to-DV conversion in ATM," Joint Collaborative Team on 3D Video Coding Extension Development of ITU-T SG 16 WP 3 and ISO/IEC JTC 1/SC 29/WG 11, JCT3V-C0134, Jan. 17-23, 2013.
(Continued)

*Primary Examiner* — Dave Czekaj
*Assistant Examiner* — Shanika Brumfield
(74) *Attorney, Agent, or Firm* — Dentons US LLP

(57) ABSTRACT

The present invention relates to a method and an apparatus for coding a video signal, and more specifically, a motion vector between viewpoints is obtained by using a depth value of a depth block, which corresponds to a current texture block, and an illumination difference is compensated. By obtaining the motion vector between the viewpoints by using the depth value of the depth block, which corresponds to the current texture block, and compensating
(Continued)

the illumination difference, the present invention can obtain an accurate prediction value of the current texture block and thus increase accuracy in inter-prediction between the viewpoints.

6 Claims, 8 Drawing Sheets

(51) Int. Cl.
*H04N 19/597* (2014.01)
*H04N 19/52* (2014.01)
*H04N 19/176* (2014.01)

(58) Field of Classification Search
USPC .......................................... 375/240.02–240.2
See application file for complete search history.

(56) References Cited

FOREIGN PATENT DOCUMENTS

| | | | |
|---|---|---|---|
| CN | 102790892 A | 11/2012 | |
| CN | 102790895 A | 11/2012 | |
| JP | 2009509454 A | 3/2009 | |
| JP | 2011519226 A | 6/2011 | |
| JP | 2015518828 A | 7/2015 | |
| JP | 2015525999 A | 9/2015 | |
| KR | 10-2007-0033863 A | 3/2007 | |
| KR | 10-2008-0053873 A | 6/2008 | |
| KR | 10-2010-0102493 A | 9/2010 | |
| KR | 10-2011-0098290 A | 9/2011 | |
| RU | 2008126660 A | 1/2008 | |
| RU | 2421933 C2 | 6/2011 | |
| WO | 2012128068 A1 | 9/2012 | |
| WO | 2012-171477 A1 | 12/2012 | |
| WO | 2012171477 A1 | 12/2012 | |
| WO | WO 2012171477 A1 * | 12/2012 | ......... H04N 13/0048 |
| WO | 2014005548 A1 | 1/2014 | |
| WO | 2014044168 A1 | 3/2014 | |

OTHER PUBLICATIONS

Tian, Dong, "CE1.h: Backward View Synthesis Prediction using Neighbouring Blocks," Joint Collaborative Team on 3D Video Coding Extension Development of ITU-T SG 16 WP 3 and ISO/IEC JTC 1/SC 29/WG 11, JCT3V-C0152, Jan. 17-23, 2011.

Chang, Yu-Lin et al., "3D-CE2.h related: Simplified DV derivation for DoNBDV and BVSP," Joint Collaborative Team on 3D Video Coding Extensions of ITU-T SG 16 WP 3 and ISO/IEC JTC 1/SC 29/WG 11, JCT3V-C0138, Apr. 20-26, 2013.

Search Report of European Patent Office in Appl'n No. 14737616.4, dated Jun. 8, 2016.

JL Lin, et al., "3D-CE5.h related: Simplification on disparity vector derivation for HEVC-based 3D video coding", Joint Collaborative Team on 3D Video Coding Extension Development of ITU-T SG 16 WP 3 and ISO/IEC JTC 1/SC 29/WG 11, JCT2-A0047, Jul. 16-20, 2012, XP030130046

YJ Chang, et al., "CE5.h related: Depth-oriented Neighboring Block Disparity Vector (DoNBDV) with virtual depth retrieval", Joint Collaborative Team on 3D Video Coding Extension Development of ITU-T SG 16 WP 3 and ISO/IEC JTC 1/SC 29/WG 11, JCT3V-B0090, Oct. 13-19, 2012, XP030130271.

C. Bartnik et al., "HEVC Extension for Multiview Video Coding and Multiview Video plus Depth Coding", ITU—Telecommunications Standardization Sector, Study Group 16 Question 6, Video Coding Experts Groups (VCEG), VCEG-AR13, Feb. 3-10, 2012.

D. Rusanovskyy et al., "Suggestion for a depth-enhanced multiview video coding extension to H.264 Annex A: Nokia 3DV Test Model (3DV-TM) Codec Description and Simulation Results", ITU—Telecommunications Standardization Sector, Study Group 16 Question 6, Video Coding Experts Groups (VCEG), VCEG-AR14, Feb. 3-10, 2012.

JL Lin et al., "3D-CE5.a related: Simplification on the disparity vector derivation for AVC-based 3D video coding", Joint Collaborative Team on 3D Video Coding Extension Development of ITU-T SG 16 WP 3 and ISO/IEC JTC 1/SC 29/WG 11, JCT2-A0046, Jul. 16-20, 2012.

J. Jung et al., "3D-CE1.h related: Adaptive method for Depth-oriented Neighboring Block Disparity Vector", Joint Collaborative Team on 3D Video Coding Extension Development of ITU-T SG 16 WP 3 and ISO/IEC JTC 1/SC 29/WG 11, JCT3V-C0112, Jan. 17-23, 2013.

YL Chang et al., "CE5.h related: Depth -oriented Neighboring Block Disparity Vector (DoNBDV) with virtual depth retrieval", Joint Collaborative Team on 3D video Coding Extension Development of ITU-T SG 16 WP 3 and ISO/IEC JTC1/SC29/WG11 2nd Meeting: Shanghai, CN, Oct. 13-19, 2012, Document: JCTV3V-B0090.

* cited by examiner

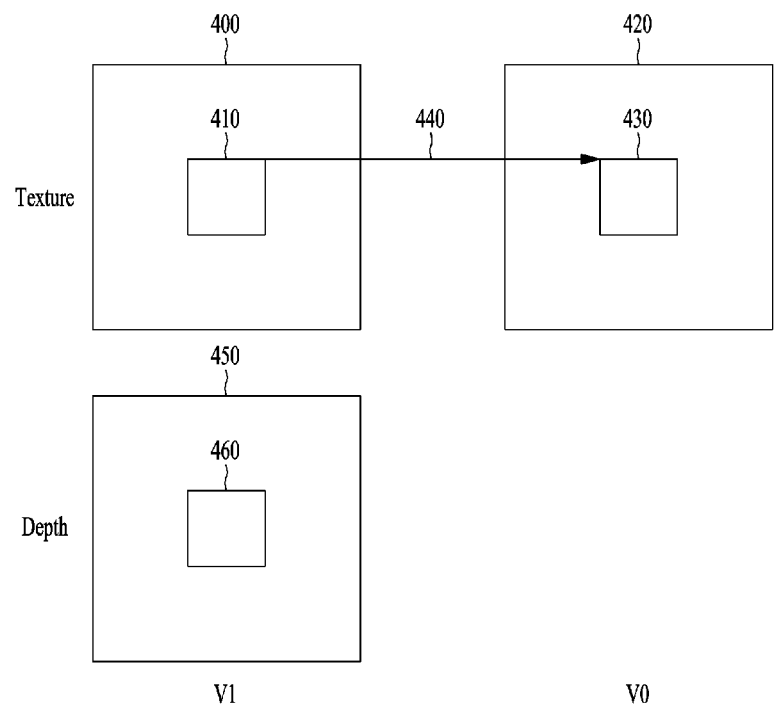
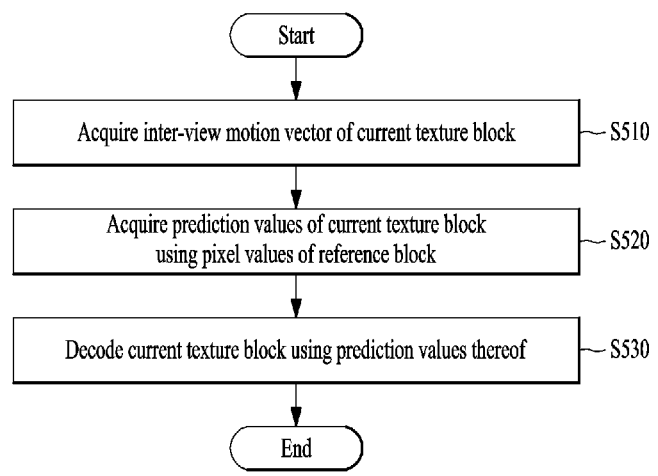

FIG. 8
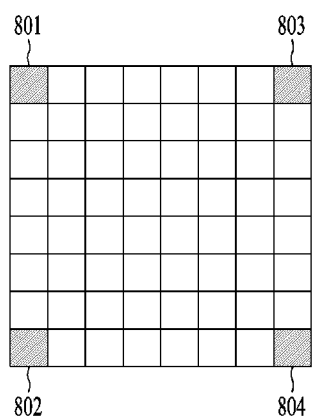
(a)
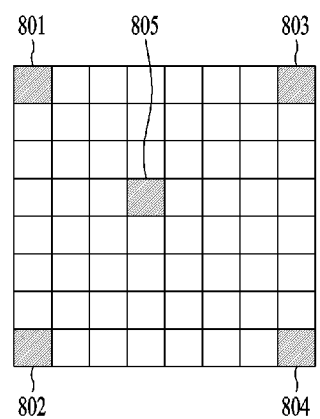
(b)
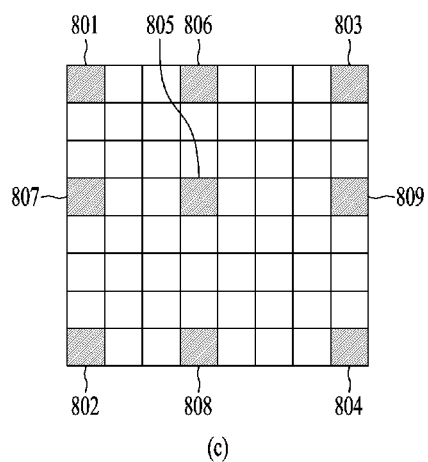
(c)
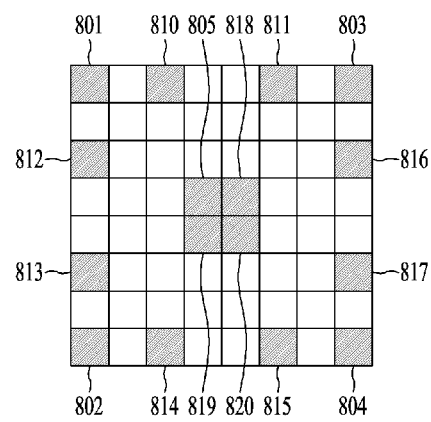
(d)

METHOD AND APPARATUS FOR PROCESSING VIDEO SIGNAL

This application is a National Stage Entry of International Application No. PCT/KR2014/000204 filed on Jan. 8, 2014, which claims benefit of U.S. Provisional Application No. 61/750,314 filed Jan. 8, 2013 and U.S. Provisional Application No. 61/750,739 filed Jan. 9, 2013, all of which are hereby incorporation herein by reference in the entirety.

TECHNICAL FIELD

The present invention relates to a method and an apparatus for coding video signals.

BACKGROUND ART

Compression refers to a signal processing technique for transmitting digital information through a communication line or storing the digital information in a form suitable for a storage medium. Compression targets include audio, video and text. Particularly, a technique of compressing images is called video compression. Multiview video has characteristics of spatial redundancy, temporal redundancy and inter-view redundancy.

DISCLOSURE

Technical Problem

An object of the present invention is to improve video signal coding efficiency.

Technical Solution

The present invention acquires an inter-view motion vector by using depth values of a depth block corresponding to a current texture block.

In addition, the present invention acquires an inter-view motion vector by using part of depth values of a depth block corresponding to the current texture block.

Furthermore, the present invention acquires a compensation factor for performing an illumination difference compensation procedure by using a neighboring pixel of the current texture block and a neighboring pixel of a reference block.

Moreover, the present invention acquires the compensation factor for illumination difference compensation according to specific conditions.

Advantageous Effects

The present invention can improve disparity compensation prediction accuracy by acquiring an inter-view motion vector using depth values of a depth block corresponding to the current texture block.

In addition, the present invention can reduce complexity of disparity compensation prediction by acquiring an inter-view motion vector using part of depth values of a depth block corresponding to the current texture block.

Furthermore, the present invention can improve disparity compensation prediction accuracy by acquiring accurate prediction values of the current texture block according to illumination difference compensation.

Moreover, the present invention can reduce complexity of illumination difference compensation by simply acquiring the compensation factor according to specific conditions.

BRIEF DESCRIPTION OF DRAWINGS

FIG. 4 illustrates an example of disparity compensation prediction according to an embodiment to which the present invention is applied.

FIG. 5 is a flowchart illustrating an example of decoding a current depth block through disparity compensation prediction according to an embodiment to which the present invention is applied.

FIG. 8 illustrates examples of part of pixels of the depth block corresponding to the current texture block, used to acquire a maximum depth inter-view motion vector and a most frequent depth inter-view motion vector according to an embodiment to which the present invention is applied.

BEST MODE

The present invention provides a video decoder including an inter-prediction unit configured to acquire a depth block corresponding to a current texture block, to acquire a first inter-view motion vector using at least one of depth values in the depth block, to acquire a reference block of the current texture block using the first inter-view motion vector and to acquire prediction values of the current texture block using the reference block, and a video signal processing method.

The at least one depth value may be at least one of depth values of a left upper pixel, a left lower pixel, a right upper pixel and a right lower pixel in the depth block.

The at least one depth value may be a largest depth value from among depth values of a left upper pixel, a left lower pixel, a right upper pixel and a right lower pixel in the depth block.

The inter-prediction unit may acquire a second inter-view motion vector derived from a neighboring block of the current texture block, acquire a texture block in a neighboring view using the second inter-view motion vector and acquire the depth block using the texture block in the neighboring view.

The depth block may be disposed at a neighboring view of the current texture block.

Modes for Invention

Techniques for compressing or decoding multiview video signal data consider spatial redundancy, temporal redundancy and inter-view redundancy. In the case of a multiview image, multiview texture images captured at two or more views can be coded in order to generate a three-dimensional image. Furthermore, depth data corresponding to the multiview texture images may be coded as necessary. The depth data can be compressed in consideration of spatial redundancy, temporal redundancy or inter-view redundancy. Depth data is information on the distance between a camera and a corresponding pixel. The depth data can be flexibly interpreted as depth related information such as depth information, a depth image, a depth picture, a depth sequence and a depth bitstream in the specification. In addition, coding can include both the concepts of encoding and decoding in the specification and can be flexibly interpreted within the technical spirit and technical scope of the present invention.

Figure 1:
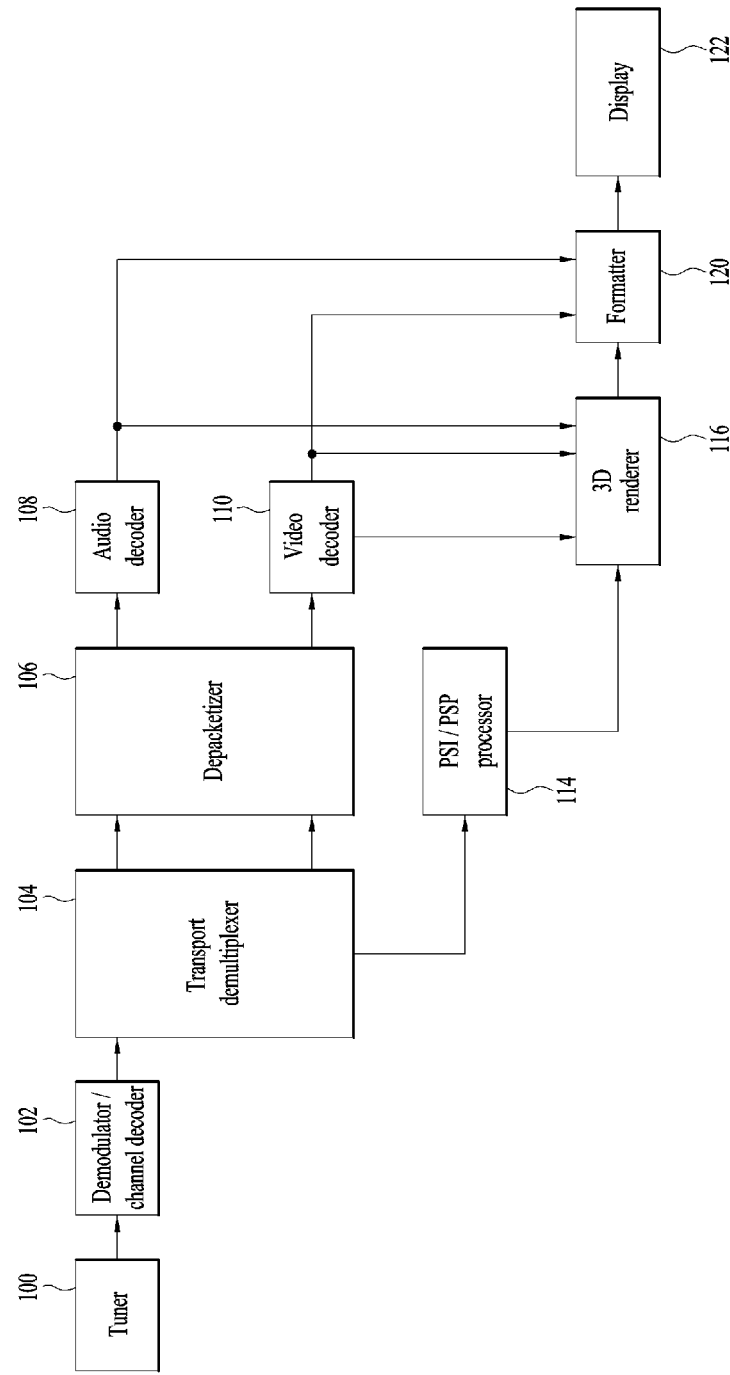
FIG. 1 is a block diagram of a broadcast receiver to which depth coding is applied according to an embodiment of the present invention.

FIG. 1 is a block diagram of a broadcast receiver to which depth coding is applied according to an embodiment to which the present invention is applied.

The broadcast receiver according to the present embodiment receives terrestrial broadcast signals to reproduce images. The broadcast receiver can generate three-dimensional content using received depth related information. The broadcast receiver includes a tuner 100, a demodulator/channel decoder 102, a transport demultiplexer 104, a depacketizer 106, an audio decoder 108, a video decoder 110, a PSI/PSIP processor 114, a 3D renderer 116, a formatter 120 and a display 122.

The tuner 100 selects a broadcast signal of a channel tuned to by a user from among a plurality of broadcast signals input through an antenna (not shown) and outputs the selected broadcast signal. The demodulator/channel decoder 102 demodulates the broadcast signal from the tuner 100 and performs error correction decoding on the demodulated signal to output a transport stream TS. The transport demultiplexer 104 demultiplexes the transport stream so as to divide the transport stream into a video PES and an audio PES and extract PSI/PSIP information. The depacketizer 106 depacketizes the video PES and the audio PES to restore a video ES and an audio ES. The audio decoder 108 outputs an audio bitstream by decoding the audio ES. The audio bitstream is converted into an analog audio signal by a digital-to-analog converter (not shown), amplified by an amplifier (not shown) and then output through a speaker (not shown). The video decoder 110 decodes the video ES to restore the original image. The decoding processes of the audio decoder 108 and the video decoder 110 can be performed on the basis of a packet ID (PID) confirmed by the PSI/PSIP processor 114. During the decoding process, the video decoder 110 can extract depth information. In addition, the video decoder 110 can extract additional information necessary to generate an image of a virtual camera view, for example, camera information or information for estimating an occlusion hidden by a front object (e.g. geometrical information such as object contour, object transparency information and color information), and provide the additional information to the 3D renderer 116. However, the depth information and/or the additional information may be separated from each other by the transport demultiplexer 104 in other embodiments of the present invention.

The PSI/PSIP processor 114 receives the PSI/PSIP information from the transport demultiplexer 104, parses the PSI/PSIP information and stores the parsed PSI/PSIP information in a memory (not shown) or a register so as to enable broadcasting on the basis of the stored information. The 3D renderer 116 can generate color information, depth information and the like at a virtual camera position using the restored image, depth information, additional information and camera parameters.

In addition, the 3D renderer 116 generates a virtual image at the virtual camera position by performing 3D warping using the restored image and depth information regarding the restored image. While the 3D renderer 116 is configured as a block separated from the video decoder 110 in the present embodiment, this is merely an example and the 3D renderer 116 may be included in the video decoder 110.

The formatter 120 formats the image restored in the decoding process, that is, the actual image captured by a camera, and the virtual image generated by the 3D renderer 116 according to the display mode of the broadcast receiver such that a 3D image is displayed through the display 122. Here, synthesis of the depth information and virtual image at the virtual camera position by the 3D renderer 116 and image formatting by the formatter 120 may be selectively performed in response to a user command. That is, the user may manipulate a remote controller (not shown) such that a composite image is not displayed and designate an image synthesis time.

As described above, the depth information for generating the 3D image is used by the 3D renderer 116. However, the depth information may be used by the video decoder 110 in other embodiments. A description will be given of various embodiments in which the video decoder 110 uses the depth information.

Figure 2:
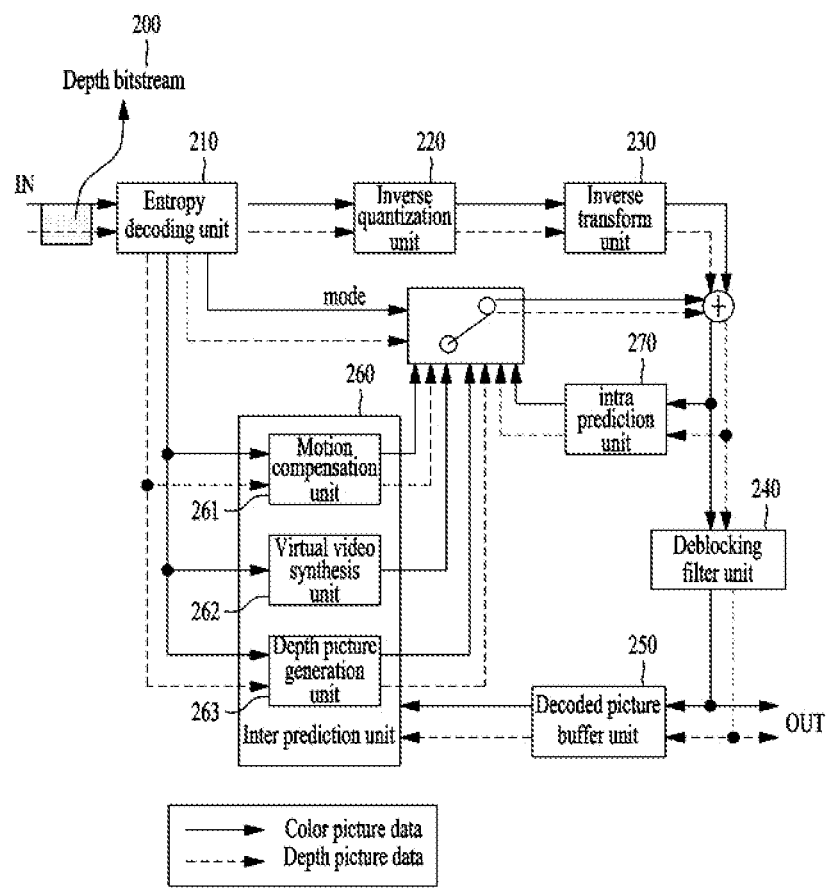
FIG. 2 is a block diagram of a video decoder according to an embodiment of the present invention.

FIG. 2 is a block diagram of the video decoder according to an embodiment to which the present invention is applied.

Referring to FIG. 2, the video decoder 110 may include an entropy decoding unit 210, an inverse quantization unit 220, an inverse transform unit 230, a deblocking filter unit 240, a decoded picture buffer unit 250, an inter-prediction unit 260 and an intra-prediction unit 270. In FIG. 2, solid lines represent flow of color picture data and dotted lines represent flow of depth picture data. While the color picture data and the depth picture data are separately represented in FIG. 2, separate representation of the color picture data and the depth picture data may refer to separate bitstreams or separate flows of data in one bitstream. That is, the color picture data and the depth picture data can be transmitted as one bitstream or separate bitstreams. FIG. 2 only shows data flows and does not limit operations to operation performed in one decoder.

First of all, to decode a received depth bitstream 200, the depth bitstream 200 is parsed per NAL. Here, various types of attribute information regarding depth may be included in an NAL header region, an extended region of the NAL header, a sequence header region (e.g. sequence parameter set), an extended region of the sequence header, a picture header region (e.g. picture parameter set), an extended region of the picture header, a slice header region, an extended region of the slice header, a slice data region or a macro block region. While depth coding may be performed using a separate codec, it may be more efficient to add attribute information regarding depth only in the case of a depth bitstream if compatibility with existing codecs is achieved. For example, depth identification information for identifying a depth bitstream can be added to the sequence header region (e.g. sequence parameter set) or the extended region of the sequence header. Attribute information regarding a depth sequence can be added only when an input bitstream is a depth coded bitstream, according to the depth identification information.

The parsed depth bitstream 200 is entropy-decoded through the entropy decoding unit 210 and a coefficient, a motion vector and the like of each macro block are extracted. The inverse quantization unit 220 multiplies a received quantized value by a predetermined constant so as to obtain a transformed coefficient and the inverse transform unit 230 inversely transforms the coefficient to restore depth information of a depth picture. The intra-prediction unit 270 performs intra-prediction using the restored depth information of the current depth picture. The deblocking filter unit 240 applies deblocking filtering to each coded macro block in order to reduce block distortion. The deblocking filter unit improves the texture of a decoded frame by smoothing edges of blocks. A filtering process is selected depending on boundary strength and an image sample gradient around a boundary. Filtered depth pictures are output or stored in the decoded picture buffer unit 250 to be used as reference pictures.

The decoded picture buffer unit 250 stores or opens previously coded depth pictures for inter-prediction. Here, to store coded depth pictures in the decoded picture buffer unit 250 or to open stored coded depth pictures, frame_num and POC (Picture Order Count) of each picture are used. Since the previously coded pictures may include depth pictures corresponding to views different from the current depth picture, depth view information for identifying views of depth pictures as well as frame_num and POC can be used in order to use the previously coded pictures as reference pictures in depth coding.

In addition, the decoded picture buffer unit 250 may use the depth view information in order to generate a reference picture list for inter-view prediction of depth pictures. For example, the decoded picture buffer unit 250 can use depth-view reference information. The depth-view reference information refers to information used to indicate inter-view dependence of depth pictures. For example, the depth-view reference information may include the number of depth views, a depth view identification number, the number of depth-view reference pictures, depth view identification numbers of depth-view reference pictures and the like.

The decoded picture buffer unit 250 manages reference pictures in order to implement more flexible inter-prediction. For example, a memory management control operation method and a sliding window method can be used. Reference picture management unifies a reference picture memory and a non-reference picture memory into one memory and manages the unified memory so as to achieve efficient management with a small-capacity memory. In depth coding, depth pictures can be separately marked to be discriminated from color pictures in the decoded picture buffer unit and information for identifying each depth picture can be used in the marking process. Reference pictures managed through the aforementioned procedure can be used for depth coding in the inter-prediction unit 260.

Referring to FIG. 2, the inter-prediction unit 260 may include a motion compensation unit 261, a virtual view synthesis unit 262 and a depth picture generation unit 263.

The motion compensation unit 261 compensates for motion of the current block using information transmitted from the entropy decoding unit 210. The motion compensation unit 261 extracts motion vectors of neighboring blocks of the current block from a video signal and acquires a motion vector prediction value of the current block. The motion compensation unit 261 compensates for motion of the current block using the motion vector prediction value and a differential vector extracted from the video signal. Motion compensation may be performed using one reference picture or a plurality of pictures. In depth coding, motion compensation can be performed using information on a reference picture list for inter-view prediction of depth pictures stored in the decoded picture buffer unit 250 when the current depth picture refers to a depth picture of a different view. Further, motion compensation may be performed using depth view information for identifying the view of the depth picture.

The virtual view synthesis unit 262 synthesizes a color picture of a virtual view using color pictures of neighboring views of the view of the current color picture. To use the color pictures of the neighboring views or to use color pictures of a desired specific view, view identification information indicating the views of the color pictures can be used. When the color picture of the virtual view is generated, flag information indicating whether the color picture of the virtual view is generated can be defined. When the flag information indicates generation of the color picture of the virtual view, the color picture of the virtual view can be generated using the view identification information. The color picture of the virtual view, acquired through the virtual view synthesis unit 262, may be used as a reference picture. In this case, the view identification information can be assigned to the color picture of the virtual view.

In another embodiment, the virtual view synthesis unit 262 can synthesize a depth picture of a virtual view using depth pictures corresponding to neighboring views of the view of the current depth picture. In this case, depth view identification information indicating the view of a depth picture can be used. Here, the depth view identification information can be derived from view identification information of a corresponding color picture. For example, the corresponding color picture can have the same poicture output order information and the same view identification information as those of the current depth picture.

The depth picture generation unit 263 can generate the current depth picture using depth coding information. Here, the depth coding information may include a distance parameter indicating a distance between a camera and an object (e.g. a Z-coordinate value on a camera coordinate system or the like), macro block type information for depth coding, information for identifying a boundary in a depth picture, information indicating whether data in RBSP includes depth-coded data, information indicating whether a data type is depth picture data, color picture data or parallax data and the like. In addition, the current depth picture may be predicted using the depth coding information. That is, inter-prediction using neighboring depth pictures of the current depth picture can be performed and intra-prediction using decoded depth information in the current depth picture can be performed.

A detailed description will be given of the concept of depth with reference to FIG. 3.

Figure 3:
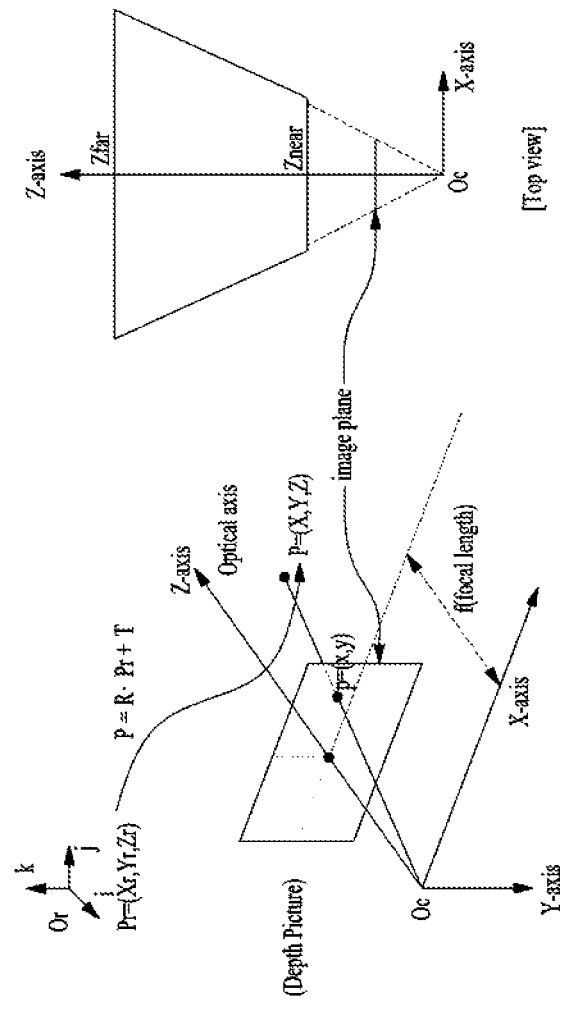
FIG. 3 illustrates the concept of depth according to an embodiment to which the present invention is applied.

FIG. 3 illustrates the concept of depth according to an embodiment of the present invention.

Referring to FIG. 3, the position Oc of a camera indicates the origin of a three-dimensional (3D) camera coordinate system, with the Z-axis (optical axis) being in line with a gaze direction. An arbitrary point P=(X, Y, Z) in the camera coordinate system can be projected to an arbitrary point p=(x, y) in a two-dimensional (2D) image plane perpendicular to the Z-axis. Here, the arbitrary point p=(x, y) in the 2D image plane may be represented as a texture value or a color value of the arbitrary point P=(X, Y, Z) in the 3D coordinate system. In this case, the 2D image plane may refer to a texture picture. The point p=(x, y) in the 2D image plane may be represented as the Z value of P=(X, Y, Z) in the 3D coordinate system. In this case, the 2D image plane may refer to a depth picture or a depth map.

In addition, P=(X, Y, Z) in the 3D coordinate system indicates an arbitrary point in the camera coordinate system. However, when a plurality of cameras is used, a common reference coordinate system for the cameras may be needed. In FIG. 3, an arbitrary point in the reference coordinate system having a point Ow as the origin may be Pw=(Xw, Yw, Zw). Pw=(Xw, Yw, Zw) may be transformed to the arbitrary point P=(X, Y, Z) in the camera coordinate system using a 3×3 rotation matrix R and a 3×1 translation vector T. For example, P can be acquired by Equation 1.

$$P = R \times P_w + T \quad \text{[Equation 1]}$$

Based on the above description, a depth picture can be defined as a set of numerical information of relative values of distances between a camera position and an object on the basis of the camera position. Depth information in the depth picture can be acquired from a Z value of 3D coordinates P=(X, Y, Z) in the camera coordinate system, which correspond to an arbitrary pixel of a texture picture. Here, the Z value belongs to the range of real numbers and may be quantized into an integer value so as to be used as depth information. For example, the depth information can be quantized as represented by Equation 2 or Equation 3.

$$Zq = \text{round}(255 \times (Z - Z_{near})/(Z_{far} - Z_{near})) \quad \text{[Equation 2]}$$

$$Zq = \text{round}(255 \times (1/Z - 1/Z_{far})/(1/Z_{near} - 1/Z_{far})) \quad \text{[Equation 3]}$$

Here, Zq indicates quantized depth information. Referring to the top view of FIG. 1, Znear can indicate the lower limit of a Z coordinate value and Zfar can indicate the upper limit of the Z coordinate value. The depth information quantized according to Equation 2 or Equation 3 may have an integer value in the range of 0 to 255.

The depth picture can be coded along with a texture image sequence or coded into a separate sequence. In this case, various embodiments can be applied for compatibility with conventional codecs. For example, a depth coding technique can be applied as an additional technique for compatibility with the HEVC codec or applied as an extended technique in H.264/AVC multiview video coding.

The present invention provides a method for performing accurate disparity compensation prediction by acquiring an inter-view motion vector of the current texture block by using a depth value of a depth block corresponding to the current texture block and performing illumination difference compensation for pixel values of a reference block obtained using the inter-view motion vector. A description will be given of disparity compensation prediction with reference to FIG. 4.

FIG. 4 illustrates an example of disparity compensation prediction according to an embodiment of the present invention.

Disparity compensation prediction is inter-prediction using pixel values of a reference block 430 in a reference picture 430, which is located at a different view from a current texture block 410 in a current texture picture 400 so as to acquire prediction values of the current texture block 410. Accuracy of inter-view inter-prediction is closely related to accuracy of an inter-view motion vector 440 that indicates the reference block 430 of the current texture block 410 and minimization of an illumination difference.

Accordingly, the present invention provides methods for acquiring the correct inter-view motion vector 440 by using a depth block 460 corresponding to the current texture block in a current depth picture 450 or a depth block corresponding to the current texture block and acquiring correct prediction values of the current texture block 410 through illumination difference compensation. In addition, the present invention provides a method for reducing complexity by simply performing the method for acquiring the inter-view motion vector 440 and the illumination difference compensation method. A description will be given of a method for decoding the current texture block 410 through disparity compensation prediction with reference to FIG. 5.

FIG. 5 is a flowchart illustrating an example of decoding the current texture block through disparity compensation prediction according to an embodiment of the present invention.

An inter-view motion vector of the current texture block can be acquired (S510). Here, the inter-view motion vector may indicate a reference block disposed at a view different from the current texture block. The inter-view motion vector of the current texture block may be acquired from a bitstream, acquired from an inter-view motion vector of a neighboring block or acquired using a depth value of a depth block corresponding to the current texture block. A method for acquiring the inter-view motion vector from the depth value will be described later with reference to FIGS. 6, 7 and 8.

Prediction values of the current texture block can be acquired using pixel values of a reference block obtained using the inter-view motion vector (520). The reference block indicated by the inter-view motion vector may be disposed at a view different from the current texture block. The pixel values of the reference block may be used as the prediction values of the current texture block. An illumination difference caused by a view difference between a reference block of a reference view and the current texture block of the current view may be generated. Accordingly, the pixel values of the reference block can be used as the prediction values of the current texture block by compensating for the illumination difference. A method for acquiring the prediction values of the current texture block through illumination difference compensation will be described later with reference to FIGS. 9 and 10.

The current texture block can be decoded using the prediction values thereof (S540).

A description will be given of an example of obtaining the inter-view motion vector of the current texture block by using a depth value of a depth block corresponding to the current texture block with reference to FIGS. 6, 7 and 8.

Figure 6:
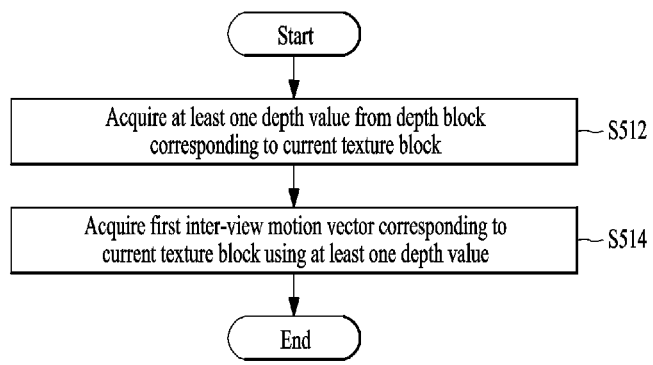
FIG. 6 is a flowchart illustrating an example of acquiring an inter-view motion vector of the current texture block by using a depth value of a depth block corresponding to the current texture block according to an embodiment to which the present invention is applied.

FIG. 6 is a flowchart illustrating an example of obtaining the inter-view motion vector of the current texture block using a depth value of the depth block corresponding to the current texture block according to an embodiment of the present invention.

At least one depth value can be acquired from the depth block corresponding to the current texture block (S512). The depth block may be a depth block in a depth picture, which is disposed at the same view as the current texture block and has the same POC as the current texture block. Alternatively, the depth block may be a depth block disposed at a neighboring view of the current texture block, acquired using an inter-view motion vector (referred to as a second inter-view motion vector hereinafter) derived from a neighboring block of the current texture block. For example, it is possible to acquire a texture block in the neighboring view, indicated by the second inter-view motion vector derived from the neighboring block, and to obtain the depth block corresponding to the current texture block using the texture block in the neighboring view. The depth block is disposed at the same view and at the same position as the texture block in the neighboring view and positioned at a neighboring view of the current texture block.

The inter-view motion vector (referred to as a first inter-view motion vector hereinafter) of the current texture block can be acquired using at least one depth value in the depth block corresponding to the current texture block (S514). A method for deriving the inter-view motion vector using a depth value will now be described on the basis of Equations 4 and 5.

$$Z = \frac{1}{\frac{D}{255} \times \left(\frac{1}{Z_{near}} - \frac{1}{Z_{far}}\right) + \frac{1}{Z_{far}}} \quad \text{[Equation 4]}$$

In Equation 4, Z denotes a distance between a corresponding pixel and a camera, D is a value obtained by quantizing Z and corresponds to depth data of the present invention, and Znear and Zfar respectively represent a minimum value and a maximum value of Z defined for a view including the depth picture. Znear and Zfar may be extracted from a bitstream through a sequence parameter set, a slice header and the like and may be information predetermined in the decoder. Accordingly, when the distance between the corresponding pixel and the camera is quantized at a level of 256, Z can be reconstructed using depth data $Z_{near}$ and $Z_{far}$ as represented by Equation 3. Subsequently, the inter-view motion vector with respect to the current texture block may be derived using reconstructed Z, as represented by Equation 5.

$$d = \frac{f \times B}{2} \quad \text{[Equation 5]}$$

In Equation 5, f denotes the focal length of a camera and B denotes a distance between cameras. It can be assumed that all cameras have the same f and B, and thus f and B may be information predefined in the decoder.

There are various embodiments of methods for obtaining the first inter-view motion vector using a depth value of a depth block corresponding to the current texture block. For example, the first inter-view motion vector can be acquired using a maximum value from among depth values of the depth block corresponding to the current texture block. Alternatively, the first inter-view motion vector can be acquired using a most frequently present value from among the depth values of the depth block corresponding to the current texture block. Alternatively, the first inter-view motion vector can be acquired according to a predetermined condition. A description will be given of various embodiments of obtaining the first inter-view motion vector with reference to FIGS. 7 and 8.

Figure 7:
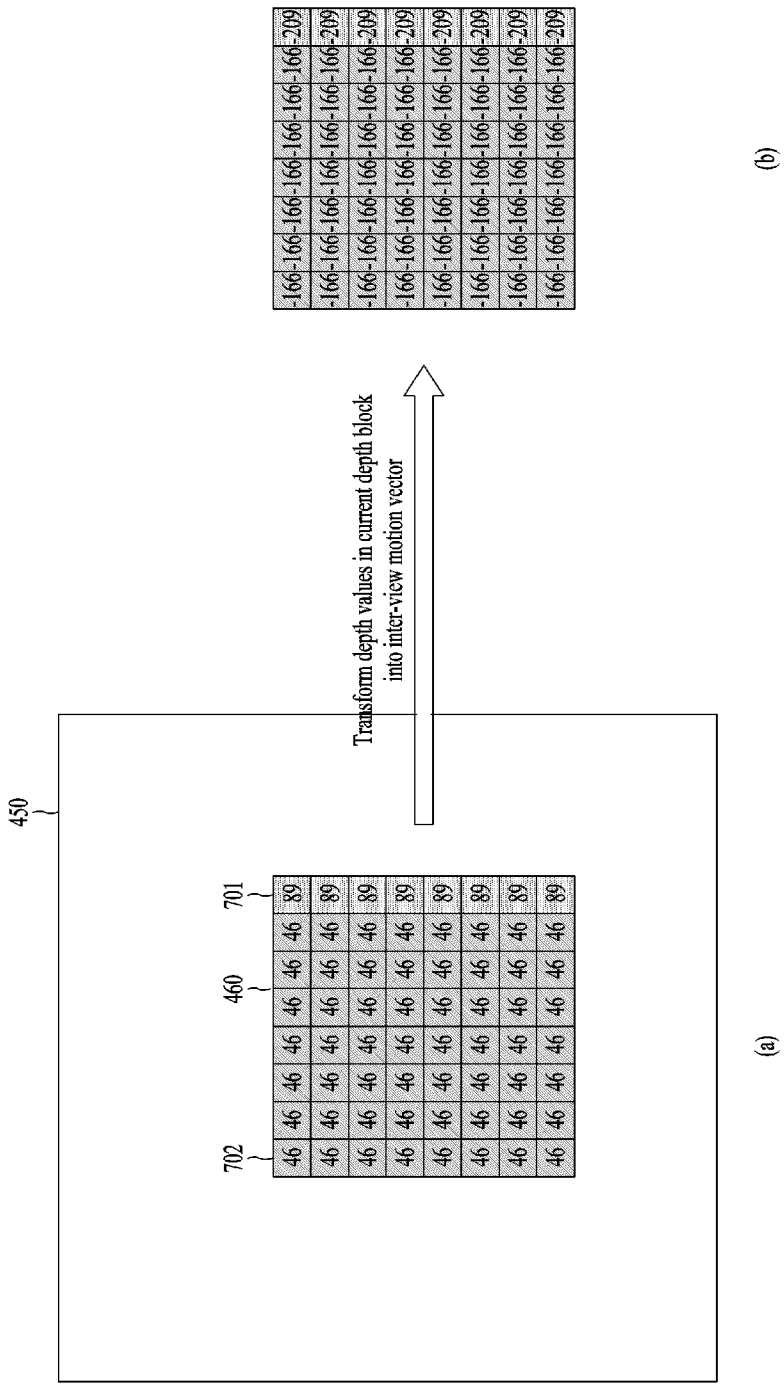
FIG. 7 illustrates an example of acquiring a depth value in the depth block corresponding to the current texture block as a first inter-view motion vector of the current texture block according to an embodiment to which the present invention is applied.

FIG. 7 illustrates an example of acquiring the first inter-view motion vector of the current texture block using a depth value in the depth block corresponding to the current texture block according to an embodiment of the present invention.

As shown in FIG. 7(a), the depth block 460 corresponding to the current texture block may include depth values. The first inter-view motion vector of the current texture block may be acquired using at least one depth value of the depth block corresponding to the current texture block according to the equations described in FIG. 6. The depth block 460 corresponding to the current texture block may include a plurality of depth values. When the first inter-view motion vector is acquired using the depth block 460 corresponding to the current texture block, which includes the plurality of depth values, a plurality of first inter-view motion vectors may be obtained as shown in FIG. 7(b). Accordingly, a description will be given of which one of the depth values of the depth block corresponding to the current texture block is used to obtain the first inter-view motion vector of the current texture block.

A method for acquiring the first inter-view motion vector of the current texture block using a depth value of the depth block corresponding to the current texture block is as follows.

1) Acquisition of the Inter-View Motion Vector Using a Maximum Depth Block

The first inter-view motion vector of the current texture block can be obtained using a largest depth value (referred to as "maximum depth value" hereinafter) from among the depth values of the depth block corresponding to the current texture block. The first inter-view motion vector obtained using the maximum depth value can be defined as a maximum depth inter-view motion vector DisMAX. Referring to FIG. 7(a), an inter-view motion vector acquired using a pixel 701 having the maximum depth value can be obtained as the first inter-view motion vector of the current texture block. The maximum depth value can be obtained by comparing all pixels in the depth block. Alternatively, the maximum depth value may be obtained through comparison of at least one pixel in the depth block. Since occlusion does not occur in an area in the depth block corresponding to the current texture block, which has the maximum depth value, disparity compensation prediction accuracy can be improved.

2) Acquisition of the Inter-View Motion Vector Using a Most Frequent Depth Value The first inter-view motion vector of the current texture block can be obtained using a most frequently present depth value (referred to as "most frequent depth value" hereinafter) from among the depth values of the depth block corresponding to the current texture block. The first inter-view motion vector obtained using the most frequent depth value can be defined as a most frequent depth inter-view motion vector DisMPD. Referring to FIG. 7(a), an inter-view vector acquired using a pixel 702 having the most frequent depth value can be obtained as the first inter-view motion vector of the current texture block. The most frequent depth value can be obtained by comparing all pixels in the depth block. Alternatively, the most frequent depth value may be obtained through comparison of at least one pixel in the depth block.

Alternatively, the depth values of the depth block corresponding to the current texture block may be transformed into inter-view motion vectors and a most frequently present inter-view motion vector may be acquired as the first inter-view motion vector of the current texture block (the most frequently present inter-view motion vector would be a most frequent depth inter-view motion vector). For example, a most frequently present inter-view motion vector in FIG. 7(b) can be acquired as the first inter-view motion vector of the current texture block. When the most frequent depth value or the most frequently present first inter-view motion vector is used, an inter-view motion vector corresponding to a majority of pixels of the depth block corresponding to the current texture block can be obtained and thus disparity compensation prediction accuracy can be improved.

3) Acquisition of the Inter-View Motion Vector According to a Specific Condition The first inter-view motion vector of the current texture block can be obtained as one of the maximum depth inter-view motion vector and the most frequent depth inter-view motion vector according to a specific condition. Under the condition, NumDisMAX indicates the number of pixels, which have the same inter-view motion vector as the maximum depth inter-view motion vector, in the depth block corresponding to the current texture block or the number of pixels, which have inter-view motion vectors similar to the maximum depth inter-view motion vector within a predetermined error range, in the depth block corresponding to the current texture block. In addition, NumDisMPD indicates the number of pixels, which have the same inter-view motion vector as the most frequent depth inter-view motion vector, in the depth block corresponding to the current texture block or the number of pixels, which have inter-view motion vectors similar to the most frequent depth inter-view motion vector within a predetermined error range, in the depth block corresponding to the current texture block.

3-1) When the sum of NumDisMAX and the number of pixels corresponding to an occlusion area exceeds half the number of pixels of the current texture block, the maximum depth inter-view motion vector can be acquired as the first inter-view motion vector of the current texture block. Otherwise, when the sum of NumDisMAX and the number of pixels corresponding to an occlusion area does not exceed half the number of pixels of the current texture block, the most frequent depth inter-view motion vector can be acquired as the first inter-view motion vector of the current texture block. Here, the occlusion area can be obtained by synthesizing the current texture block and the depth block corresponding to the current texture block or through Equation 6.

$$\text{OcclusionArea} = (\text{abs}(\text{DisMPD}-\text{DisMAX}) \gg \text{Shift}) \times \text{NumRowOFDisMAX} \qquad [\text{Equation 6}]$$

In Equation 6, NumRowOFDisMAX indicates the number of rows in which pixels having inter-view motion vectors identical or similar to DisMAX are present, and Shift is for transformation of an inter-view motion vector value into an integer when the inter-view motion vector value is not represented as an integer.

3-2) The first inter-view motion vector of the current texture block can be determined by comparing NumDisMPD with NumDisMAX.

For example, when abs(NumDisMPD−NumDisMAX) is less than a predetermined rate of the number of pixels of the current texture block, the maximum depth inter-view motion vector can be obtained as the inter-view motion vector of the current texture block. Otherwise, the most frequent depth inter-view motion vector can be obtained as the inter-view motion vector of the current texture block.

Alternatively, when NumDisMPD/NumDisMAX is less than a predetermined threshold value, the maximum depth inter-view motion vector can be obtained as the inter-view motion vector of the current texture block. Otherwise, the most frequent depth inter-view motion vector can be obtained as the inter-view motion vector of the current texture block.

3-3) When abs (DisMPD−DisMAX) exceeds a predetermined threshold value, the maximum depth inter-view motion vector can be obtained as the inter-view motion vector of the current texture block. Otherwise, the most frequent depth inter-view motion vector can be obtained as the first inter-view motion vector of the current texture block.

3-4) When a virtual depth value is used, a temporary inter-view motion vector may be present. One of the maximum depth inter-view motion vector and the most frequent depth inter-view motion vector, which is closer to the temporary inter-view motion vector, can be acquired as the first inter-view motion vector of the current texture block.

The aforementioned maximum depth inter-view motion vector and most frequent depth inter-view motion vector can be obtained by comparing one or more pixels in the depth block corresponding to the current texture block. That is, the maximum depth inter-view motion vector and the most frequent depth inter-view motion vector can be obtained by comparing depth values of all pixels of the depth block corresponding to the current texture block or inter-view motion vectors corresponding to the depth values, or by comprising depth values of part of the pixels of the depth block corresponding to the current texture block or inter-view motion vectors corresponding thereto. A description will be given of an example of obtaining the maximum depth inter-view motion vector and the most frequent depth inter-view motion vector by comparing only some pixels of the depth block corresponding to the current texture block with reference to FIG. 8.

FIG. 8 illustrates examples of part of the pixels of the depth block corresponding to the current texture block, which are used to obtain the maximum depth inter-view motion vector and the most frequent depth inter-view motion vector.

It is possible to compare depth values corresponding to only part of the pixels of the depth block corresponding to the current texture block, obtain a largest depth value from among the depth values as a maximum depth value and acquire a most frequently present depth value from among the depth values of the pixels as a most frequent depth value. The compared pixels may be changed according to a predetermined condition.

For example, depth values of a left upper pixel 801, a left lower pixel 802, a right upper pixel 803 and a right lower pixel 804 of the depth block corresponding to the current texture block, shown in FIG. 8(a), can be compared and a largest pixel value from among the depth values can be obtained as a maximum depth value. In addition, a most frequently present depth value from among the depth values can be obtained as a most frequent depth value. The maximum depth inter-view motion vector can be obtained using the maximum depth value and the most frequent depth inter-view motion vector can be acquired using the most frequent depth value.

Referring to FIG. 8(b), the depth values of the left upper pixel 801, the left lower pixel 802, the right upper pixel 803, the right lower pixel 804 and a center pixel 805 can be compared so as to obtain a maximum depth value or a most frequent depth value. In addition, the maximum depth inter-view motion vector can be obtained using the maximum depth value and the most frequent depth inter-view motion vector can be acquired using the most frequent depth value.

Referring to FIG. 8(c), the depth values of the left upper pixel 801, the left lower pixel 802, the right upper pixel 803, the right lower pixel 804, the center pixel 805, an upper pixel 806, a left pixel 807, a lower pixel 808 and a right pixel 809 can be compared so as to obtain a maximum depth value or a most frequent depth value. In addition, the maximum depth inter-view motion vector can be obtained using the maximum depth value and the most frequent depth inter-view motion vector can be acquired using the most frequent depth value.

Referring to FIG. 8(d), the depth values of the left upper pixel 801, the left lower pixel 802, the right upper pixel 803, the right lower pixel 804, center pixels 805, 818, 819 and 820, upper pixels 810 and 811, left pixels 812 and 813, lower pixels 814 and 815 and right pixels 816 and 817 can be compared so as to obtain a maximum depth value or a most frequent depth value. In addition, the maximum depth inter-view motion vector can be obtained using the maximum depth value and the most frequent depth inter-view motion vector can be acquired using the most frequent depth value.

In addition to the methods described in FIGS. 8(a) to 8(d), the maximum depth value and the most frequent depth value can be obtained by comparing pixels selected in various manners.

A reference block of the current texture block can be obtained using the first inter-view motion vector acquired as described above with reference to FIGS. 6, 7 and 8. In addition, the prediction values of the current texture block can be acquired by performing illumination difference compensation on prediction values of the reference block, as described above with reference to FIG. 5. Illumination difference compensation is necessary to compensate for an inter-view difference generated due to different illumination or camera characteristics at respective views when a multi-view image is captured. A description will be given of an exemplary method for compensating for an illumination difference with reference to FIGS. 9 and 10.

Figure 9:
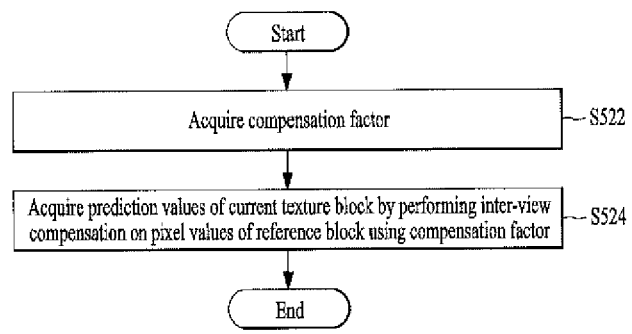
FIG. 9 is a flowchart illustrating an example of compensating for an illumination difference according to an embodiment to which the present invention is applied.

FIG. 9 is a flowchart illustrating an example of compensating for an illumination difference according to an embodiment of the present invention.

A compensation factor can be obtained (S522). The compensation factor is information used for illumination difference compensation and may include a first compensation factor and a second compensation factor. The first compensation factor and the second compensation factor can be obtained using a neighboring pixel of the current texture block and a neighboring pixel of the reference block. A method for obtaining the compensation factor using the neighboring pixel of the current texture block and the neighboring pixel of the reference block will be described with reference to FIG. 10.

The prediction values of the current texture block can be obtained by performing inter-view compensation for pixel values of the reference block using the compensation factor (S524). Illumination difference compensation can be performed using a linear equation such as Equation 7.

$$\text{Pred}[x,y] = a \times \text{Ref}[x,y] + b \qquad \text{[Equation 7]}$$

In Equation 7, pred[x,y] indicates the illumination-difference-compensated prediction values of the current texture block, Ref[x,y] indicates a pixel value of the reference block, a represents the first compensation factor for illumination difference compensation and b represents the second compensation factor for illumination difference compensation.

FIG. 10 illustrates examples of a current texture block, a reference block, a neighboring pixel of the current texture block and a neighboring pixel of the reference block, which is used during an illumination difference compensation procedure.

Figure 10A:
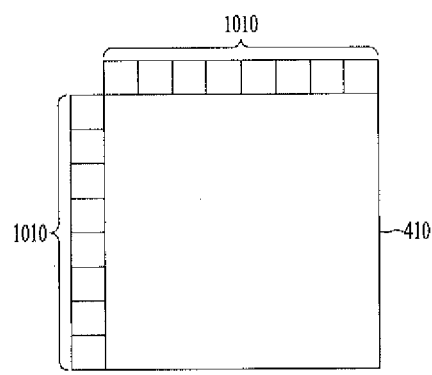
FIGS. 10(a) and 10(b) illustrate an example of the current texture block, a reference block, neighboring pixels of the current texture block and neighboring pixels of the reference block, which are used during an illumination difference compensation procedure, according to an embodiment to which the present invention is applied.
Figure 10B:
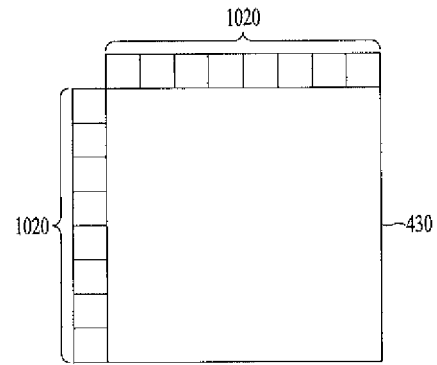

FIG. 10(a) shows a current texture block 410 and a neighboring pixel 1010 of the current texture block. The neighboring pixel 1010 of the current texture block may refer to at least one of left pixels or upper pixels of the current texture block 410. FIG. 10(b) shows a reference block 430 and a neighboring pixel 1020 of the reference block. The neighboring pixel 1020 of the reference block may include at least one of left pixels or upper pixels of the reference block 430.

A description will be given of a method for obtaining a compensation factor using the neighboring pixel 1010 of the current texture block and the neighboring pixel 1020 of the reference block.

1) The compensation factor can be obtained through Equation 8 according to linear least square estimation.

$$\alpha = \frac{I \times \sum_{i=0}^{I} Pred_N(i) Ref_N(i) - \sum_{i=1}^{I} Pred_N(i) \times \sum_{i=1}^{I} Ref_N(i)}{I \times \sum_{i=1}^{I} Ref_N(i) Ref_N(i) - \left(\sum_{i=1}^{I} Ref_N(i)\right)^2} = \frac{A_1}{A_2} \qquad \text{[Equation 8]}$$

$$\beta = \frac{\sum_{i=1}^{I} Pred_N(i) - \alpha \sum_{i=1}^{I} Ref_N(i)}{I}$$

In Equation 8, a indicates the first compensation factor and 0 indicates the second compensation factor. In addition, i represents indices allocated to the neighboring pixel 101 of the current texture block and the neighboring pixel 1020 of the reference block, PredN(i) indicates a neighboring pixel value of the current texture block and RefN(i) indicates a neighboring pixel value of the reference block.

2) The compensation factor can be obtained through Equation 9 using the mean and standard deviation of the neighboring pixel 1010 of the current texture block and the neighboring pixel 1020 of the reference block.

$$\alpha = \frac{\text{sigma}_{pred}}{\text{sigma}_{ref}} \qquad \text{[Equation 9]}$$

$$\beta = \text{mean}_{pred} - \alpha \times \text{mean}_{rej}$$

In Equation 9, $\text{sigma}_{pred}$ indicates the standard deviation of the neighboring pixels 1010 of the current texture block, $\text{sigma}_{ref}$ indicates the standard deviation of the neighboring pixels 1020 of the reference block, $\text{mean}_{pred}$ represents the mean of the neighboring pixels 1010 of the current texture block and $\text{mean}_{ref}$ represents the mean of the neighboring pixels 1020 of the reference block.

3) The first compensation factor can be set to 1 and only the second compensation factor can be obtained through Equation 10.

$$\beta = \frac{\sum_{i=1}^{I} Pred_N(i) - \sum_{i=1}^{I} Ref_N(i)}{I} \qquad \text{[Equation 10]}$$

4) The second compensation factor can be set to 0 and only the first compensation factor can be obtained through Equation 11.

$$\alpha = \frac{\text{sum}_{pred}}{\text{sum}_{ref}} \quad \text{[Equation 11]}$$

In Equation 11, $\text{sum}_{pred}$ indicates the sum of neighboring pixels of the current texture block and $\text{sum}_{ref}$ indicates the sum of neighboring pixels of the reference block.

The compensation factor obtained through the aforementioned methods may not be used according to specific conditions. For example, when the first and second compensation factors are obtained though method 2 and a difference between the first compensation factor and 1 is less than a predetermined threshold value, the first compensation factor is not used and the first compensation factor can be set to 1 and only the second compensation factor can be obtained as in method 3. When the first and second compensation factors are obtained though method 2 and a difference between the second compensation factor and 0 is less than a predetermined threshold value, the second compensation factor is not used and the second compensation factor can be set to 0 and only the first compensation factor can be obtained as in method 4. Alternatively, when the first and second compensation factors are obtained through method 2 and both the first and second compensation factors can be used, the first and second compensation factors can be acquired using method 1. Such flexible methods enable more efficient illumination difference compensation.

As described above, the decoding/encoding apparatus to which the present invention is applied may be included in a multimedia broadcast transmission/reception apparatus such as a DMB (digital multimedia broadcast) system to be used to decode video signals, data signals and the like. In addition, the multimedia broadcast transmission/reception apparatus may include a mobile communication terminal.

The decoding/encoding method to which the present invention is applied may be implemented as a computer-executable program and stored in a computer-readable recording medium and multimedia data having a data structure according to the present invention may also be stored in a computer-readable recording medium. The computer-readable recording medium includes all kinds of storage devices storing data readable by a computer system. Examples of the computer-readable recording medium include a ROM, a RAM, a CD-ROM, a magnetic tape, a floppy disk, an optical data storage device, and a medium using a carrier wave (e.g. transmission over the Internet). In addition, a bitstream generated according to the encoding method may be stored in a computer-readable recording medium or transmitted using a wired/wireless communication network.

INDUSTRIAL APPLICABILITY

The present invention can be used to code video signals.

The invention claimed is:

1. A method for processing a video signal by a video decoder, comprising:
    acquiring a second inter-view motion vector from a neighboring block of a current texture block;
    acquiring a depth block corresponding to the current texture block using the acquired second inter-view motion vector, the depth block being indicated by the acquired second inter-view motion vector and being located in a neighboring view of the current texture block;
    deriving a first inter-view motion vector from a maximum depth value of a left upper corner pixel, a left lower corner pixel, a right upper corner pixel, and a right lower corner pixel in the acquired depth block; and
    decoding the current texture block using the derived first inter-view motion vector.

2. The method according to claim 1, wherein each of the first inter-view motion vector and the second inter-view motion vector indicates a motion vector used for disparity compensated prediction.

3. The method according to claim 1, wherein the neighboring view is different than a current view of the current texture block.

4. A video decoder, comprising:
    an entropy decoding unit configured to receive a bitstream; and
    an inter-prediction unit connected to the entropy decoding unit and configured to:
    acquire a second inter-view motion vector from a neighboring block of the current texture block,
    acquire a depth block corresponding to a current texture block using the acquired second inter-view motion vector, the depth block being indicated by the acquired second inter-view motion vector and being located in a neighboring view of the current texture block,
    derive a first inter-view motion vector from a maximum depth value of a left upper corner pixel, a left lower corner pixel, a right upper corner pixel, and a right lower corner pixel in the acquired depth block,
    decode the current texture block using the derived first inter-view motion vector.

5. The video decoder according to claim 4, wherein each of the first inter-view motion vector and the second inter-view motion vector indicates a motion vector used for disparity compensated prediction.

6. The video decoder according to claim 4, wherein the neighboring view is different than a current view of the current texture block.

* * * * *